United States Patent [19]
Ikegaya
[11] Patent Number: 4,810,577
[45] Date of Patent: Mar. 7, 1989

[54] HEAT AND OIL-RESISTANT ELECTRIC INSULATED WIRE

[76] Inventor: Norio Ikegaya, 4830 Takatsuka, Kami-mura, Hamana-gun, Shizuoka Prefecture, Japan

[21] Appl. No.: 2,147

[22] Filed: Jan. 12, 1987

[30] Foreign Application Priority Data

Jan. 23, 1986 [JP] Japan .................................. 61-12478

[51] Int. Cl.$^4$ ........................ B32B 15/00; B32B 27/20; H01B 7/00

[52] U.S. Cl. ............................. 428/391; 174/110 FC; 174/110 S; 428/379

[58] Field of Search ............... 428/379, 375, 383, 391; 174/110 SR, 110 FC, 110 AR, 110 S

[56] References Cited

U.S. PATENT DOCUMENTS

| | | | |
|---|---|---|---|
| 4,028,431 | 6/1977 | Futami et al. | 525/199 X |
| 4,243,542 | 1/1981 | Mine | 524/267 |
| 4,260,698 | 4/1981 | Tatemoto et al. | 525/199 X |
| 4,431,701 | 2/1984 | Hamada et al. | 428/391 X |
| 4,614,779 | 9/1986 | Watanabe et al. | 525/199 |

*Primary Examiner*—Lorraine T. Kendell

[57] ABSTRACT

A heat and oil-resistant electric insulated wire comprises a conductor coated with an insulating layer which is formed of a vinylidene fluoride-based fluororubber and a silicone rubber added thereto. The amount of silicone rubber added is in a range of 2 to 30 parts by weight, preferably 5 to 20 parts by weight per 100 parts of said fluororubber, said fluororubber being a vinylidene fluoride-propylene hexafluoride copolymer and-/or a vinylidene fluoride-propylene hexafluoride-ethylene tetrafluoride terpolymer.

3 Claims, No Drawings

HEAT AND OIL-RESISTANT ELECTRIC INSULATED WIRE

BACKGROUND OF THE INVENTION

1. Field of the Invention

The present invention relates to a heat- and oil-resistant electric insulated wire for use in a drawing line for automobiles, machine tools, generators, motors, etc., which is formed through the coating of a conductor with a specific insulating layer and in particular, to such an insulated wire wherein a separator such as a paper tape, polyester tape or the like is not required between a conductor and an insulating layer to provide a good producing workability and serviceability.

2. Description of the Prior Art

There are conventionally known heat- and oil resistant electic insulated wires made of a conductor coated with an insulating layer of vinylidene fluoride-based fluororubber. These insulated wires are being utilized in a drawing line for automobiles, machine tools, generators, motors, etc., due to heat and oil resistances of the insulating layer of vinylidene fluoride-based fluororubber.

With such conventional electric wires of vinylidene fluoride-based fluororubber, however, various disadvantages are encountered: During cross-linking, the insulating layer is adhered to the conductor, resulting in a degraded stripping property of a terminal insulator of the resultant wire. Therefore, in stripping the insulating layer on the terminal of the wire to place the wire into service, a long time is required for the stripping, leading to a difficulty of use. In addition, even after the insulating layer has been peeled off, some of the rubber remains on the conductor and for this reason, a solder would not be deposited onto such portion, or a conductive failure may be produced upon working of the terminal.

Thereupon, to overcome the above disadvantages, there has been proposed an electric wire having a separator, such as a paper tape or a polyester tape, interposed between a conductor and an insulating layer of a vinylidene fluoride-based fluororubber. With such wire, however, the separator is difficult to cut and a portion thereof may remain without being cut, in stripping the insulating layer at the terminal. Therefore, when the wire is to be placed into service, a long time is required and consequently, this wire is also difficult to use. Another disadvantage of this wire is that an operation of winding the separator around the conductor is required to provide an increase in production steps, resulting in an inferior production workability.

SUMMARY OF THE INVENTION

It is an object of the present invention to provide a heat- and oil-resistant electric insulated wire wherein the disadvantages found in the prior art are overcome.

It is another object of the present invention to provide such an insulated wire wherein a separator such as a paper tape, polyester tape or the like is not required between a conductor and an insulating layer to provide a good production workability and serviceability.

According to the present invention, the above objects are accomplished by providing a heat- and oil-resistant electric insulated wire comprising a conductor coated with an insulating layer which is formed of a vinylidene fluoride-based fluororubber and a silicone rubber added thereto in an amount of 2 to 30 parts by weight per 100 parts of the vinylidene fluoride-based fluororubber, said fluororubber being a vinylidene fluoride-propylene hexafluoride copolymer and/or a vinylidene fluoride-propylene hexafluoride-ethylene tetrafluoride terpolymer.

The insulating layer resulting from the addition of a silicone-rubber to a vinylidene fluoride-based fluororubber in an amount of 2 to 30 parts by weight per 100 parts of such fluororubber has not only heat- and oil-resistances but also a good mechanical strength. In the use of such insulating layer, the adhesion thereof to the conductor is eliminated without the reduction in the above properties and the tensile characteristics of the fuluororubber and hence, it is unnecessary to interpose a separator between the insulating layer and the conductor. Consequently, the workability can be improved in the production of such an insulated wire and further, an serviceability can be improved.

DETAILED DESCRIPTION OF THE INVENTION

Vinylidene fluoride-based fluororubbers which may be used in the present invention include those which can be cross-linked with an organic peroxide in order that the resulting wire has electric characteristics for electric lines, specifically such as vinylidene fluoride-propylene hexafluoride copolymers, vinylidene fluoride-propylene hexafluoride-ethylene tetrafluoride terpolymers, etc., which may be employed alone or in a mixture of two or more thereof.

Illustrative of silicone rubbers as described above are ferrosilicone rubbers, methylphenyl silicone rubbers, methylphenylvinyl silicone rubbers, dimethyl silicone rubbers, methylvinyl silicone rubbers, or the like.

It should be noted that these may be used as a silicone rubber, which contains a filler in an amount of 30 to 100 parts by weight per 100 parts by weight of silicone rubber and which are commercially available in the form of a silicone rubber compound.

In the present invention, additives which are commonly used as rubber compounding ingredients may be also added as required, such as cross-linking agents and auxiliaries, fillers and the like.

The amount of silicone rubber added to the vinylidene fluoride-based rubber is in a range of 2 to 30 parts by weight, preferably 5 to 20 parts by weight per 100 parts by weight of the vinylidene fluoride-based rubber. If the amount of silicone rubber added is less than 2 parts by weight, it is impossible to prevent the adhesion of the fluororubber to the conductor. The amount of silicone rubber exceeding 30 parts by weight causes a reduction in strength and oil resistance, resulting in the loss of characteristics of fluororubber.

The heat- and oil-resistant electric insulated wire according to the present invention is produced by adding a silicone rubber to a vinylidene fluoride-based fuluororubber and further adding thereto a filler, a cross-linking agent such as 2,5-dimethyl-2,5-(tertially butyl peroxy) hexane or the like, and/or a cross-linking auxiliary such as triallyl isocyanurate or the like. Then, the resulting mixture is extruded into a thickness of 0.5 mm onto a conductor such as a tin-plated, annealed copper stranded wire assembly having a nominal cross section of 0.75 $mm^2$ to coat the conductor therewith. Thereafter, the coating is heated and cross-linked for two minutes by use of steam under a high pressure of 14 $kgf/cm^2$.

EXAMPLES

Examples 1 to 5 and Comparative Examples 1 to 4

Each of mixtures having compositions given in Table 1 was intactly extruded into a thickness of 0.5 mm onto a tin-plated, annealed copper stranded wire assembly having a nominal sectional arear of 0.75 $mm^2$ to coat the stranded wire assembly therewith and then, the coating was heated and cross-linked by use of steam under a high pressure of 14 $kgf/cm^2$ to give an electric insulated wire.

Example 5

An electric insulated wire was produced in the same manner as in the above Examples, except that a paper separator was longitudinally interposed between the stranded wire assembly and the coating.

The results of the tests in Examples 1 to 5 and Comparative Examples 1 to 5 are given in Table 2.

Note 3: Tensile strength and elongation (JIS C 3004)

A tubular sample having a length of about 100 mm was cut from the finished article, and mark lines were taken down on the central portion of the sample at a distance of 50 mm. The sample was tensioned at a rate of 500 mm/min to determine the maximum tensile load and the length between the mark lines at breaking and to calculate the tensile strength and % elongation per $cm^2$.

Note 4: Heat aging property (KIS C 3004)

An tubular sample having a length of about 150 mm was cut from the finished article and left to stand in a thermostat set at 250±3° C. for 96 hours. After it was withdrawn, the sample was left to stand at room temperature for 4 hours or more, and the tensile strength and elongation of the sample were determined within 96 hours in the same manner as in Note 3 to calculate the respective retensions thereof based on an initial value.

As apparent from Table 2, with the samples (in Examples 1 to 5) in accordance with the present invention, the variation in outside diameter for oil resistance was +6% or less; for heat aging property, the tensile strength retension was 108% or more and the elongation retension was 89% or more. Thus, these samples were excellent in heat- and oil-resistances and also, they had a mechanical strength (tensile strength of the insulator) as large as 108 $kgf/cm^2$ or more. In addition, no adhesion to the conductor occurred. In this way, the production workability was improved without need for any separator between the conductor and the insulating layer, and they were readily placed into service. On the contrary, with the sample in Comparative Example 1, the adhesion to the conductor occurred, and with the samples in Comparative Examples 2 to 4, the variation in outside diameter for oil resistance was as large as 9%

TABLE 1

| | Example No. | | | | | Comparative Example No. | | | | |
|---|---|---|---|---|---|---|---|---|---|---|
| Components (part*) | 1 | 2 | 3 | 4 | 5 | 1 | 2 | 3 | 4 | 5 |
| Fluororubber | 100 | 100 | 100 | 100 | 100 | 100 | 100 | 100 | 100 | 100 |
| Silicone rubber | 2 | 5 | 10 | 20 | 30 | 0 | 40 | 50 | 60 | 0 |
| Filler** | 50 | 50 | 50 | 50 | 50 | 50 | 50 | 50 | 50 | 50 |
| Cross-linking auxiliary** | 4 | 4 | 4 | 4 | 4 | 4 | 4 | 4 | 4 | 4 |
| Cross-linking agent** | 1.5 | 1.5 | 1.5 | 1.5 | 1.5 | 1.5 | 1.5 | 1.5 | 1.5 | 1.5 |
| Separator | ab.*** | ab. | ab. | ab. | ab. | ab. | ab. | ab. | ab. | present |

*Part by weigh

**The cross-linking auxiliary used is a triallyl isocyanurate. The cross-linking agent used is 2, 5-dimethyl-2, 5-(tertiary butyl peroxide) hexane. The filler used is a silicate-based material.

***ab. = absent

TABLE 2

| | Example No. | | | | | Comparative Example No. | | | | | |
|---|---|---|---|---|---|---|---|---|---|---|---|
| Characteristics | 1 | 2 | 3 | 4 | 5 | 1 | 2 | 3 | 4 | 5 | Testing method |
| Oil resistance (% variation in outside diameter) | +1 | +2 | +2 | +4 | +6 | +1 | +9 | +10 | +12 | +1 | Note 1 |
| Remaining of separator upon stripping | — | — | — | — | — | — | — | — | — | present | Note 2 |
| Adhesion to conductor | ab.* | ab. | ab. | ab. | ab. | present | ab. | ab. | ab. | ab. | Note 2 |
| Tensile strength of insulator($kgf/cm^2$) | 158 | 140 | 118 | 125 | 108 | 160 | 80 | 85 | 81 | 160 | Note 3 |
| Elongation of insulator (%) | 344 | 320 | 277 | 240 | 170 | 350 | 120 | 145 | 141 | 350 | Note 3 |
| Heat aging: | | | | | | | | | | | |
| Tensile strength retension (%) | 108 | 105 | 108 | 113 | 109 | 107 | 122 | 117 | 106 | 107 | Note 4 |
| Elongation retension(%) | 91 | 92 | 89 | 90 | 91 | 91 | 88 | 87 | 90 | 91 | Note 4 |

*ab. = absent

Note 1: Oil resistance

A sample having a length of about 150 mm was cut from the finished article and the outside diameter thereof was determined. Then, the sample was immersed into an ASTM No. 3 oil at 150±3° C. for 72 hours with the opposite ends thereof being exposed above the oil surface. After withdrawing of the sample, the outside diameter of the sample was determined to calculate the % variation in outside diameter.

Note 2: Remaining of and adhesion of the separator on the conductor upon stripping The approximately 10 mm long terminal of the finished article was stripped, and it was visually observed whether the separator remained at the stripped portion without being cut and whether the rubber was adhered to the conductor to remain thereon.

or more, and the tensile strength and elongation of the insulator were as inferior as 85 $kgf/cm^2$ or less and 145% or less, respectively. With the sample in Comparative Example 5, there were problems that some of the separator remained upon stripping and so on.

What is claimed is:

1. A heat and oil-resistant electric wire, comprising a conductor coated with a strippable insulating layer consisting essentially of a vinylidene fluoride-based fluororubber having a silicone rubber added thereto in an amount of 2 to 30 parts by weight per 100 parts of said fluororubber thereby preventing adhesion of the insulating layer to the conductor, said fluororubber being selected from the group consisting of a vinylidene fluoride-propylene hexafluoride copolymer, vinylidene fluoride-propylene hexafluoride-ethylene tetrafluoride terpolymer, and mixtures thereof.

2. A heat and oil-resistant electric insulated wire according to claim 1, wherein said silicone rubber comprises at least one rubber selected from the group consisting of a ferrosilicone rubber, a methylphenyl silicone rubber, a dimethyl silicone rubber and a methylvinyl silicone rubber.

3. A heat and oil-resistant electric insulated wire according to claim 1, wherein the amount of silicone rubber added is in a range of 5 to 30 parts per 100 parts of said vinylidene fluoride-based fluororubber.

* * * * *